United States Patent [19]

Chen

[11] Patent Number: 5,241,888
[45] Date of Patent: Sep. 7, 1993

[54] SLIDABLE COMPOUND MITER SAW

[75] Inventor: Ruey-Zon Chen, Taichung, Taiwan

[73] Assignee: Rexon Industrial Corporation, Ltd., Taichung Hsien, Taiwan

[21] Appl. No.: 923,722

[22] Filed: Jul. 31, 1992

[51] Int. Cl.$^5$ .......................... B23D 45/04; B27B 5/20
[52] U.S. Cl. ................................... 83/471.3; 83/486.1; 83/490; 83/581
[58] Field of Search ................... 83/471.3, 486.1, 490, 83/581, 485, 486, 487, 488, 489, 614, 821; 384/428, 438

[56] References Cited

U.S. PATENT DOCUMENTS

| 3,464,295 | 9/1969 | Gallion | 408/112 |
| 4,179,231 | 12/1979 | Hadden | 408/112 |
| 4,869,142 | 9/1989 | Sato et al. | 83/467.1 |

Primary Examiner—Eugenia Jones
Attorney, Agent, or Firm—Chapin, Neal & Dempsey

[57] ABSTRACT

A powered compound miter saw that can perform miter and bevel cuts and which is adapted so that the saw blade can be moved to provide a wide cut. In particular, the compound miter saw employs a sliding mechanism that provides consistent cutting performance as the saw blade is moved from a fully retracted to a fully extended position even when the saw blade is making a severe bevel cut. The sliding mechanism employs three slide bars which have the saw blade mounted on one end thereof and which can laterally move within a housing. The slide bars are configured in a triangular arrangement and are supported within the housing by a combination of linear ball bearings and a plastic bushing.

13 Claims, 3 Drawing Sheets

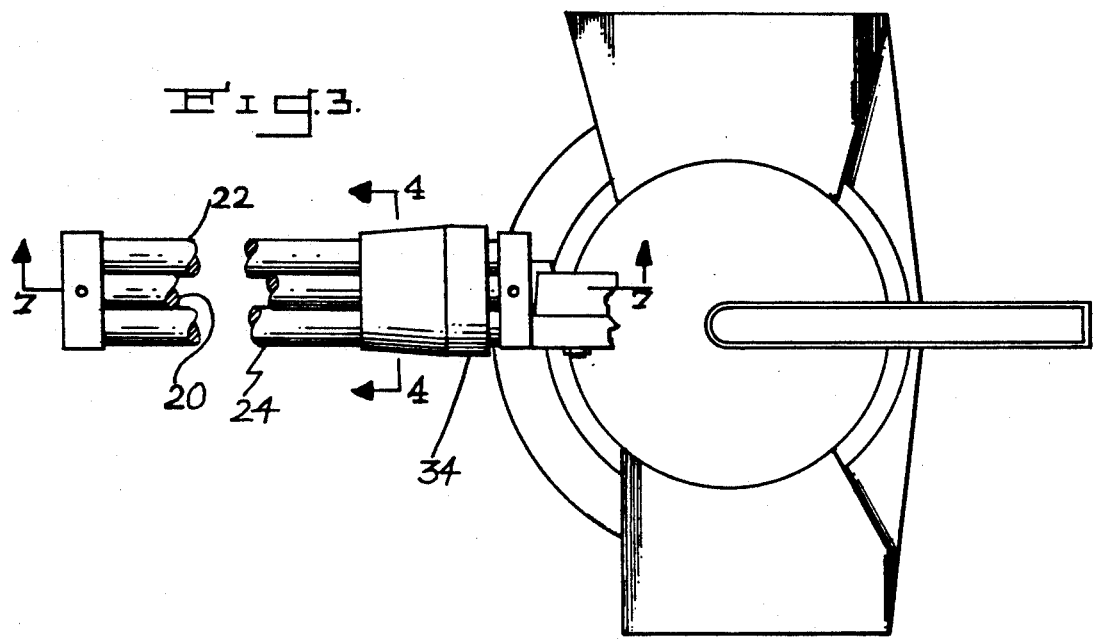
Fig.3.
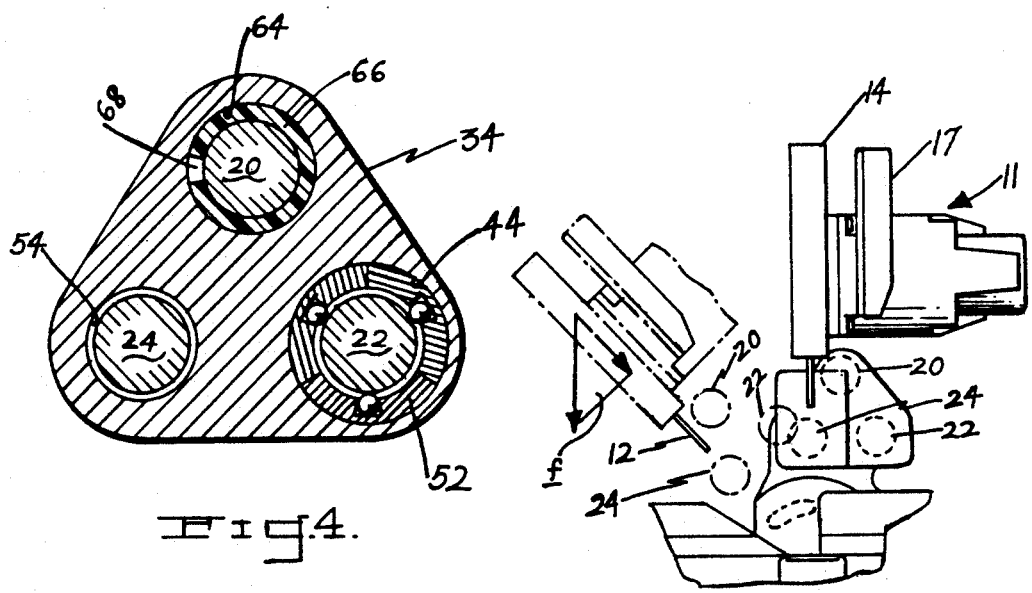
Fig.4.
Fig.5

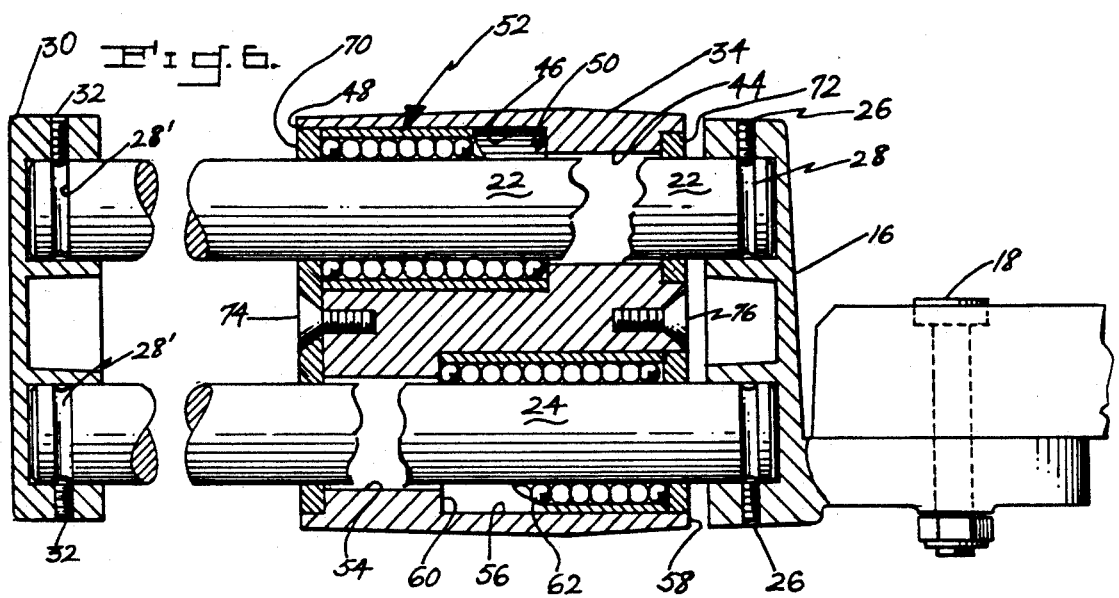

SLIDABLE COMPOUND MITER SAW

FIELD OF THE INVENTION

The present invention relates generally to miter saws and more particularly, to a powered compound miter saw capable of performing miter and bevel cuts while also being slidable over the work piece.

BACKGROUND OF THE INVENTION

Compound miter saws of the motor driven type are well known cutting devices for performing both miter and bevel cuts. However, one disadvantage with such devices is that their maximum cutting length is limited by the diameter of the saw blade. This limitation requires the operator of the saw to re-position the work piece in order to complete a cut longer than the diameter of the saw blade.

To overcome this disadvantage, compound miter saws have been provided with slide mechanisms so that the saw blade can be moved laterally of the work piece to enable longer cuts to be made without the need to re-position the same. One such compound miter saw is described in U.S. Pat. No. 4,869,142 ('142 Patent).

In particular, the '142 Patent discloses a compound miter saw which includes a gear casing 13 rotatably mounted to a bracket 9 which is in turn, fixably attached to one end of a pair of laterally spaced, parallel slide bars 11. The slide bars are movably supported by a holder 7 so that saw blade can be selectively moved between its retracted and fully extended positions. The holder is carried by a turntable and is also pivotable vertically so that the saw blade may be positioned to any desired bevel angle at any miter cut angle.

The compound miter saw disclosed in the '142 Patent, however, has a number of drawbacks. In particular, when the saw blade is fully extended, the weight of the power saw combined with the downward movement of the saw, produces a downward momentum of the saw which results in vertical flexing and/or motion of the cantilever mounted bars. Additionally, the slide rods in the '142 Patent are supported within the holder 7 by a slide clearance fit. As such, when the saw is in the retracted position, the bottom surface of the slide rods are in contact with the housing while a clearance spacing exists between the top surface of the slide rods and the housing. When the saw blade is fully extended, the slide rods will rotate downward an amount proportional to the clearance spacing between the slide rods and the upper surface of the support housing in addition to flexing. In addition, as the forwardly rotating saw blade cuts the work piece there is an upward torque or "kick" which is also transmitted to the base 11. As a result of the above design features, the saw blade will tend to vibrate or oscillate vertically. When the saw blade is tilted to a substantial bevel angle, the effect of such vibration of the saw blade may prove even more troublesome because the vertical vibratory or oscillatory motion is at an oblique angle to the plane of the bevel cut. This will likely result in inconsistent cutting performance and unequal drag on opposite sides of the blade which may cause excessive heat to be generated and therefore greater blade wear. In addition, the friction contact between the slide rods and the housing may cause some difficulty for the operator in moving the saw blade smoothly and comfortably especially when cutting very dense and hard materials.

The principle object of this invention is to provide an improved compound miter saw of slidable construction which is capable of more consistent cutting performance even when the saw blade is fully extended and tilted for maximum bevel cuts.

Another object of the present invention is to provide an improved compound miter saw of slidable construction which has a slide mechanism that provides easier, smoother and more consistent cutting performance under all conditions than saws heretofore available.

SUMMARY OF THE INVENTION

The present invention relates to a power type compound miter saw of the type having an improved slide mechanism for movement of the saw blade so that more uniform and precise results may be achieved under all cutting conditions. In the preferred embodiment, the saw blade is disposed on a motor drive housing which is supported by a bracket for vertical angular movement. The bracket is in turn affixed to the ends of two lower slide bars and one upper slide bar arranged in a triangular configuration. Each of the slide bars are slidably supported within a housing which is tiltably mounted to a miter saw turntable. Each of the lower slide bars employ a roller bearing member while the upper slide bar utilizes a low friction bushing. The triangular arrangement of the slide bars in conjunction with the bearing and bushing combination results in an improved compound miter saw that yields a more consistent and smoother cutting performance under all conditions than is found in conventional slide type compound miter saws.

BRIEF DESCRIPTION OF THE DRAWINGS

The following detailed description will be more fully understood with reference to the accompanying drawings in which:

FIG. 3 is a plan view of the compound miter saw;

FIG. 4 is a section view on an enlarged scale taken along line 4—4 of FIG. 3;

FIG. 5 is a front elevation view showing the saw blade and slide mechanism disposed in both vertical and bevel cutting orientations;

FIG. 6 is a section view, on an enlarged scale, taken along line 6—6 of FIG. 1; and FIG. 7 is a section view, on an enlarged scale, taken along line 7—7 of FIG. 3.

DETAILED DESCRIPTION OF THE PREFERRED EMBODIMENT

Figure 1:
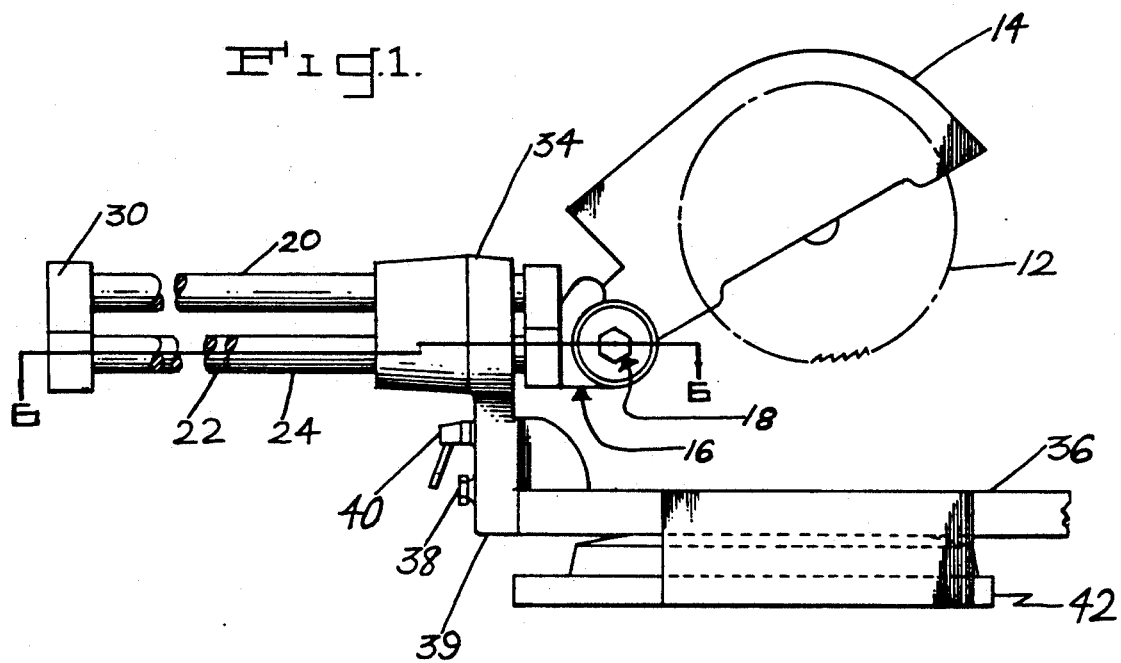
FIG. 1 is a side elevation view showing the compound miter saw of the present invention in a retracted and "up" position.
Figure 2:
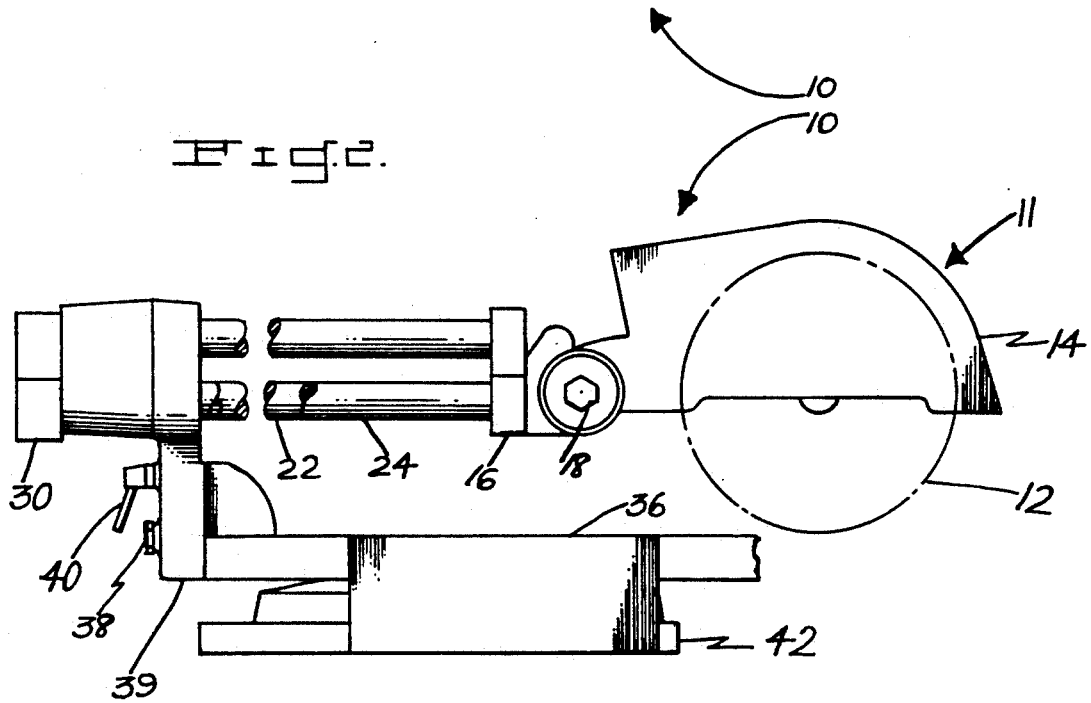
FIG. 2 is a similar view showing the compound miter saw in a fully extended and "down" position.

FIG. 1 shows a compound miter saw 10 of the type embodying this invention in its "up" and fully retracted position whereas FIG. 2 depicts the compound miter saw 10 "down" and in its fully extended position. Compound miter saw 10 comprises a power operated saw 11 driving a circular saw blade 12 (FIG. 5) disposed within a saw blade housing 14. The power saw 11 also includes an electric drive motor 15 of any well known type and a handle 17 having an on/off switch for operating the saw.

The power saw 11 is pivotably mounted by pivot means for vertical pivotable movement relative to the forward end of a bracket member 16 about a transversely disposed pin, shaft or bolt 18. The bracket 16 is in turn affixed to the forward ends of an upper slide bar 20 and lower slide bars 22 and 24, as by set screws 26 (FIGS. 6 and 7) adapted to fit into an annular groove 28 provided adjacent the forward end of each of the bars. The opposite or rear end of bars 20, 22, and 24 are similarly secured to an end plate 30 by means of set screws 32 fitting into grooves 28' (FIGS. 6 and 7). the longitudinal axes of the bars 20, 22 and 24 are disposed at or above the transversely positioned pin or bolt 18. In the preferred embodiment, bars 20, 22 and 24 are hollow shafts of alloy steel which have a diameter in the range of ⅞ to 1½ inches.

Slide bars 20, 22, and 24 are slidable within a housing or bearing block 34 at the upper end of an arm 39 pivotally attached to a miter saw turntable 36 about a pivot pin or bolt 38 for bevel cutting of a work piece disposed on the upper surface of the turntable 36. A locking lever 40 is provided for selectively releasing and locking the support arm 39 in any desired angular position from 0° to 45° with respect to the upper surface of the turntable 36 so that the saw blade 12 supported by slide bars 20, 22, and 24 can perform any desired bevel cut. The turntable 36 is also rotatable with respect to a base 42 so that the saw blade may be positioned to perform miter cutting at any desired angle.

As best shown by FIGS. 4 and 5, slide bars 20, 22, and 24 are disposed relative to each other in a triangular arrangement or relationship with an apex of the triangle disposed upwardly and its base defined by the lower slide bars 22 and 24. The three slide bars are preferably equally spaced apart to define an equilateral triangle adapted to provide maximum cantilever support for the saw mechanism when fully extended as in FIG. 2 and/or when the saw blade is vertical or tilted as in FIG. 5. Upper slide bar 20 is supported by a bushing 66 (to be described) while the lower slide bars 22 and 24 are movably supported by linear ball bearing members 52, 62 (to be described).

As shown in FIGS. 4 and 6, the housing or bearing block 34 comprises three cylindrical bores 44, 54 and 64 which extend axially through the housing 34 in a generally parallel-spaced and triangular relationship. The bore 44 has a stepped inner diameter section 46 which forms an annular shoulder 50. Section 46 of bore 44 has a larger inner diameter than the remainder of the bore 44 and extends from the rear face 48 of the housing to shoulder 50 and is sized to receive the bearing member 52. Bearing member 52 may be any suitable linear ball bearing such as a Barden linear bearing available from the Barden Corp. of Danbury, Conn. and which is disclosed in U.S. Pat. No. 3,692,371. Bearing 52 provides a relatively long bearing surface for smooth and easy sliding movement of slide bar 22 with minimum applied force. The bearing member 52 is retained between the shoulder 50 and a rear cover plate 70 which is attached to housing 34 by a screw 76.

Bore 54 also has a stepped diameter section 56 which forms a shoulder 60 having a larger inner diameter than the remainder of the bore 54. Section 56 extends from shoulder 60 to the forward end 58 of the housing and is likewise sized to receive a linear ball bearing 62 of the same type as heretofore described with reference to bearing 52. Similarly, the bearing 62 is retained between the shoulder 60 and a rear cover plate 72 which is likewise attached to housing 34 by a screw 74. The bearings 52 and 62 each have an axial length greater than the one-half the length of the housing 34 whereby they are co-extensive longitudinally within the housing.

Bore 64 has a generally uniform diameter throughout the length of the housing 34 and has the bushing 66 disposed therein which extends over substantially the entire length of bore 64. In the preferred embodiment, bushing 66 is made of a synthetic plastic material such as polytetrafluoroethylene (PTFE) which may be fiber reinforced and which has a high degree of resiliency and a low coefficient of friction. Bushing 66 is preferably a split-sleeve construction with a spacing 68 (FIG. 4) for ease of fitting about bar 20.

The above arrangement of bearing members 52 and 62 and bushing 66 has the combined effect of providing an overall bearing length substantially greater then each linear bearing per se and of equalizing linear thrust on end plates 70 and 72. The design of bearings 52 and 62, which are relatively expensive, combined with the bushing 66 enables a significant reduction in ball bearing size without a commensurate reduction in stability and overall bearing characteristics of the sliding mechanism.

The triangular configuration of slide bars 20, 22, and 24 also provides a slide mechanism characterized by minimized vibration or oscillatory motion of the saw blade in comparison to conventional devices having two slide bar mechanisms resulting from the downward momentum of the power saw which is a function of the weight of the power saw and the downward cutting motion of the saw blade. Not only is the deflection of the saw blade 12 reduced when performing vertical cutting (i.e., 0° bevel angle), but even when saw blade is cutting at its maximum bevel angle of 45° (FIG. 5). As described heretofore, when the saw blade is at a bevel angle, any deflection or "kick back" of the saw blade will tend to manifest itself in terms of saw vibration or oscillation which is at an oblique angle to the saw blade and this includes a component of force f (FIG. 5) which is perpendicular to the plane of the cut being made by the saw. This reduction in deflection is realized in part because irrespective of the bevel position of the saw blade, the triangular arrangement of three bars 20, 22, and 24 combined with the bushing and bearing combination, ensures that adequate support is always provided for the saw blade.

Additionally, use of a full bushing 66 for supporting the upper slide bar 20 in combination with two bearing members of shorter length mounted adjacent the opposite ends of the housing 34 for supporting the lower slide bars 22, 24, allow the benefits of the present invention to be readily realized without increasing the materials costs of the bearing members. Moreover, it has been found that the bushing 66 tends to stabilize the saw against upward recoil as the saw cuts into the work piece in a clockwise direction as depicted by the arrow in FIG. 2 while providing a dampening mechanism for other induced shock and vibration as is normally encountered when operating a miter saw.

Finally, because the bushing is readily replaceable at a substantially lower cost than the linear bearings, the maintenance cost for a saw of the type embodying the present invention is substantially less than for other such slidable compound miter saws.

The foregoing description is intended primarily for purposes of illustration. This invention may be embodied in other forms or carried out in other ways without departing from the spirit or scope of the invention. Modifications and variations still falling within the spirit or the scope of the invention will be readily apparent top those of skill in the art.

What is claimed:

1. A slidable compound miter saw having a power driven circular saw vertically pivotable about a horizontal axis comprising: a rotatable turntable for miter cutting; an arm member carried by said turntable having a vertical position and being tiltable for bevel cutting and having a slide mechanism comprising a bearing block carried by said arm member; three bars slidably disposed within said bearing block in spaced parallel relationship with having longitudinal axes said bars defining a triangle, by a bracket connecting a forward end of each of said bars to the power saw to enable the power saw to be moved with respect to said arm member, said bearing block comprises first and second ball bearings adapted to slidably support two of said three bars and a bushing adapted to slidably support the other one of said three bars.

2. The device of claim 1, wherein said triangle is approximately an isosceles triangle.

3. The device of claim 1, wherein said bushing is made of a synthetic plastic material.

4. The device of claim 1, wherein one of said bars is disposed above the other two bars and the other two bars define the base of said triangle which is generally parallel to said turntable when said arm member is in the vertical position.

5. The device of claim 1, wherein the length of each of said first and second ball bearings is substantially smaller than the length of said bearing block.

6. The device of claim 1, wherein said first and second ball bearings are mounted from opposite sides of said bearing block.

7. The device of claim 1, wherein said longitudinal axes of said bars are disposed at or above the horizontal axis about which the power saw vertically pivots.

8. A slidable compound miter saw having a power driven circular saw vertically pivotable about a horizontal axis comprising: a rotatable turntable for miter cutting; an arm member carried by said turntable having a vertical position and being tiltable for bevel cutting and having a slide mechanism comprising a bearing block carried by said arm member; three bars slidably disposed within said bearing block in spaced parallel relationship with having longitudinal axes said bars defining a triangle, a bracket connecting a forward end of each of said bars to the power saw to enable the power saw to be moved with respect to said arm member, said bearing block comprises a first ball bearing adapted to slidably support a first one of said three bars and a bushing adapted to slidably support a second one of said three bars.

9. The device of claim 8, wherein said bearing block comprises a second ball bearing adapted to slidably support a third one of said three bars.

10. The device of claim 8, wherein said triangle is approximately an isosceles triangle.

11. The device of claim 8, wherein one of said bars is disposed above the other two bars and the other two bars define the base of said triangle which is generally parallel to said turntable when said arm member is in the vertical position.

12. The device of claim 8, wherein said bushing is made of a synthetic plastic material.

13. The device of claim 8, wherein said longitudinal axes of said bars are disposed at or above the horizontal axis about which the power saw vertically pivots.

* * * * *